United States Patent Office 3,793,307
Patented Feb. 19, 1974

3,793,307
PROCESS FOR REMOVAL OF CATALYST RESIDUES
Albert N. De Vault, Bartlesville, Okla., assignor to Phillips Petroleum Company, Bartlesville, Okla.
No Drawing. Filed Dec. 19, 1972, Ser. No. 316,529
Int. Cl. C08d 5/04
U.S. Cl. 260—85.1   6 Claims

ABSTRACT OF THE DISCLOSURE

The removal of hydrogenation catalyst residue from hydrogenated thermoplastic or elastomeric polymers in solution is readily achieved by treating the hydrogenated catalyst residue-containing polymer solution with an aqueous solution of a water-soluble phosphate salt in the presence of an oxidizing agent prior to separation.

---

This invention relates to polymerization processes. More particularly, the invention relates to the removal of catalyst residues from hydrogenated thermoplastic and elastomeric polymers in solution.

The catalytic hydrogenation of unsaturated polymers such as unsaturated rubbers is a widely used industrial process. Generally, the hydrogenation catalyst can be deactivated and removed from the hydrogenated polymer-containing reaction effluent by the addition of water followed by filtration. However, when the hydrogenation is carried out in the presence of a trihydrocarbyl aluminum-reduced organo nickel compound as the catalyst, separation of the catalyst residues is made difficult by the formation of a gelatinous precipitate when water is added. With such catalysts, the problem of the gelatinous precipitate has been largely overcome by the addition of aqueous phosphate compositions prior to filtration. While effective in deactivating the catalyst and providing an essentially nongelatinous precipitate, the use of such aqueous phosphate compositions has not been entirely effective in causing essentially complete precipitation of the catalyst, with the result that sufficient zero-valent nickel passes through the filter in a finely divided, colloidal form, to contaminate the polymer product.

It is an object of the present invention to provide an improved process for the removal of hydrogenation catalyst residues from a hydrogenated polymer composition containing such residues. It is another object of the present invention to provide a process for the removal of hydrogenation catalyst from solutions of polymers in a manner which avoids the formation of colloidal size precipitates. Other aspects, objects, and advantages of this invention will be apparent from the disclosure and claims.

In accordance with the present invention, it has been discovered that treating a solution of a hydrogenated thermoplastic or elastomeric polymer containing trihydrocarbyl aluminum-reduced organo nickel hydrogenation catalyst with an aqueous phosphate solution in the presence of an oxidizing agent results in a polymer-containing solution from which the catalyst residues can be readily removed.

The present invention is particularly suitable for the removal of hydrogenation catalyst systems which are formed by mixing (a) a compound of the formula $Al(R)_3$, wherein R is hydrogen or an alkyl, cycloalkyl or aryl radical or combinations thereof having 1 to 20 carbon atoms; and (b) a compound of the formula

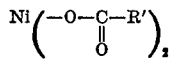

wherein R' is hydrogen or an alkyl, cycloalkyl or aryl radical or combinations thereof having 1 to 20 carbon atoms.

Examples of compounds having the Formula (a) are triisobutylaluminum, triethylaluminum, trieicosylaluminum, dicyclohexyl(phenyl)aluminum, aluminum hydride, trimethylaluminum, dibenzylaluminm hydride, tolylaluminum dihydride, trimethylcyclopentylaluminum, tri(4-tetradecylcyclohexyl)aluminum, tri(5 - cyclopentylpentyl) aluminum, tri(4-cyclohexylphenyl)aluminum, tri(3-phenyl-cyclopentyl)aluminum, and the like.

Examples of compounds having the Formula (b) are nickel stearate, nickel acetate, nickel propionate, nickel formate, nickel octoate, nickel benzoate, nickel naphthenate, nickel eicosate, the nickel esters of cyclohexane carboxylic acid, o-toluic acid, phenylacetic acid, 4-cyclopentylbutyric acid, 3-methylcyclopentane carboxylic acid, 4-cyclohexylbenzoic acid, 4-(1-naphthyl)cyclohexane carboxylic acid, and the like.

It is desirable to treat the hydrogenated polymer in solution, preferably while dissolved in the hydrocarbon solvent, such as paraffins, cycloparaffins or aromatics, or any mixture of these materials. Examples of suitable solvents include n-pentane, n-octane, cyclohexane, benzene, toluene, and the like, or mixtures of these. The polymer concentration in the solvent can vary over the range of 1 to 50 weight percent, although concentrations of about 5 to 25 weight percent are preferred.

The process of this invention is applicable in the separation of the metals contained in organometal catalyst systems as defined above used in the hydrogenation of any elastomeric or thermoplastic polymer having residual unsaturation therein, such as homopolymers and copolymers of monoolefins having from 2 to 8 carbon atoms; homopolymers and copolymers of conjugated dienes having from 4 to 12 carbon atoms and copolymers of conjugated dienes having from 4 to 12 carbon atoms and monovinylidene-substituted aromatic compounds having from 8 to 18 carbon atoms; and the like. A presently preferred use of the process of this invention is for the treatment of hydrogenated polymers and copolymers of conjugated dienes as defined above and copolymers of such dienes with monovinylidene-substituted aromatic compounds as described above; and in particular for the treatment of hydrogenated butadiene/styrene copolymers having a molecular weight in the approximate range of 25,000 to 125,000, especially in the range of 30,000 to 75,000. Such copolymers contain from about 30 to about 44 parts by weight of butadiene per 100 parts by weight of total monomer charge.

Such presently preferred copolymers can be prepared by any conventional techniques known in the art, such as those disclosed in U.S. Pat. 2,975,160. For example, a mixture of butadiene and styrene monomers can be polymerized using butyllithium as the catalyst and tetrahydrofuran as the randomizing agent. Likewise, the hydrogenation can be carried out in any manner known in the art. For example, the copolymer can be hydrogenated over nickel octoate/triethylaluminum system. Generally, the hydrogenation of a polymeric composition, such as the butadiene/styrene copolymer as above described, is carried out by contacting the polymeric composition in solution with the hydrogenation catalyst under conditions which include temperatures in the range of about 50° to about 500° F. and gauge pressures up to about 1,000 p.s.i. The reaction time can vary from 1 minute to 25 hours, or more, and the reaction can be either a batch or continuous operation. Preferred conditions include a temperature in the range of about 170° F. to about 400° F.; a pressure in the range of about 10 p.s.i.g. to about 500 p.s.i.g.; and a reaction time in the range of about 3 minutes to about 10 hours. Generally, when hydrogenating the polymer in solution, the pressure will be the lowest practical to maintain the reaction mixture substantially in the liquid phase.

The resulting hydrogenated polymer, as well as the other hydrogenated polymers of the present invention, are preferably polymers which have been sufficiently hydrogenated to remove substantially all of the olefinic unsaturation.

In accordance with the present invention, following the termination of the hydrogenation reaction, the catalyst-containing reaction mixture is contacted with an aqueous phosphate solution in the presence of an oxidizing agent. More particularly, the catalyst-containing reaction mixture is sequentially contacted with an aqueous phosphate solution in the presence of oxidizing agent. Preferably, the aqueous phosphate composition is added to the catalyst-containing reaction mixture prior to the addition of the oxidizing agent. The resulting precipitated catalyst residues can be separated from the hydrogenated polymer solution by any means known in the art and is conveniently carried out by filtration.

The aqueous phosphate compositions which are used in the process of the present invention comprise any ammonium phosphate, such as meta, monobasic, or dibasic, in aqueous solution, and including partially or completely ammonia-neutralized aqueous solutions of phosphoric acid, optionally in the presence of excess ammonia. The pH of the aqueous phosphate treating solutions is greater than 5, preferably greater than 6, and the phosphate ion content is in the range of about 5 to about 50 weight percent. For example, commercial phosphate solutions such as 9:30:0 or 10:30:0 can be used. Such solutions have phospate ion contents of about 40 and about 46 weight percent, and ammonia contents of about 11 and about 12 weight percent, respectively, and a pH of about 6.2. The amount of aqueus composition employed preferably is such as to provide a ratio of at least 18 mols of water per mol of nickel.

The oxidizing agents of the present inveniton are selected from the group consisting of molecular oxygen and oxygen-containing inorganic and organic compounds which exhibit an electrochemical reaction potential at 25° C. of at least 0.250 volt. Molecular oxygen is presently preferred as an oxidizing agent and can be provided in the form of oxygen per se or in an oxygen-containing gas such as air. Preferred oxygen-containing compounds which exhibit an electrochemical reaction potential at 25° C. of at least 0.250 volt are selected from the group consisting of hydrogen peroxide; hypochlorous acid; organic hydroperoxides having the formula ROOH, wherein R is a primary, secondary or tertiary alkyl, cycloalkyl, aralkyl or heterocyclic radical containing from 1 to 12 carbon atoms; organic peroxides having the formula R'OOR', wherein each R' is individually a primary, secondary or tertiary alkyl, cycloalkyl, aralkyl or heterocyclic radical containing from 1 to 12 carbon atoms; alkyl ketone peroxides having from 2 to 16 carbon atoms; cycloalkyl ketone peroxides having from 4 to 8 carbon atoms; and Group $Ia$ and Group $IIa$ metal peroxides. Representative of such oxygen-containing compounds which exhibit an electrochemical reaction potential at 25° C. of at least 0.25 volt are, in addition to hydrogen peroxide and hypochlorous acid, t-butyl hydroperoxide, p-methane hydroperoxide, diethyl peroxide, dibenzoyl peroxide, di-t-butyl peroxide, ethyl methyl ketone peroxide, methyl isobutyl ketone peroxide, methyl amyl ketone peroxide, cyclohexanone peroxide, cyclopentanone peroxide, cyclobutanone peroxide, sodium peroxide, calcium peroxide and barium peroxide. The amount of oxidizing agent which is employed in the practice of the present invention should be such as to provide an oxygen:nickel equivalent ratio at least 1:1, i.e., a molar ratio of oxygen:nickel of 0.5:1.

In the removal of catalyst residues in accordance with the present invention, the hydrogenation catalyst-containing reaction mixture can be sequentially treated by first adding to the reaction mixture the aqueous phosphate solution followed by the subsequent addition of the oxidizing agent, since it is a particular feature of the present invention that the catalyst must be deactivated prior to the addition of the oxidizing agent. Alternatively, sufficient water can be added to the hydrogenation catalyst-containing reaction mixture to deactivate the hydrogenation catalyst and the phosphate solution and oxidizing agent can then be added in admixture or individually by any sequence. The treating method of the present invention is considered complete when a sample taken of the polymer solution exhibits the color characteristic of nickel salts, e.g., the green cast characteristics of nickel phosphate or nickel hydroxide, or when there is no appreciable change in the amount of precipitate between consecutively taken samples. Generally, treating times are on the order of one minute to about 48 hours and more particularly one minute to about 60 minutes.

The following examples are exemplary of the invention.

A 62 styrene/38 butadiene random copolymer was prepared using the following recipe and conditions:

| | Parts by weight |
|---|---|
| Cyclohexane | 663 |
| Butadiene | 38 |
| Styrene | 62 |
| Tetrahydrofuran | 1.25 |
| n-Butyllithium | 0.12 |

Charge order was: one-half cyclohexane, tetrahydrofuran, butadiene, styrene, remainder of cyclohexane, n-butyllithium. The reaction mixture was heated to 130° F. just before adding the n-butyllithium, and the temperature rose to 218° F. five minutes after adding the n-butyllithium. Total reaction time was 20 minutes. Reaction pressure was 45 p.s.i.g. on initiation of the polymerization reaction, and the pressure rose to 65 p.s.i.g. during the reaction.

The reaction effluent was cooled to 140° F. and concentrated to a solids content of about 15 weight percent.

The cooled, concentrated reaction mixture (cement) was mixed with 0.15 part by weight per 100 parts by weight of polymeric material of a nickel octoate-triethylaluminum mixture having a nickel:aluminum mol ratio of 2:1; preheated to 292° F. and hydrogenated under 300 p.s.i.g. hydrogen pressure at 355° F., with a residence time of 4 minutes. There was substantially no ring hydrogenation and substantially complete hydrogenation of acyclic olefinic bonds.

The hydrogenated polymer cement containing 0.15 part by weight of nickel per 100 parts by weight of polymer was divided into several aliquot portions. The hydrogenated polymer cement was characterized by a blackish cast resulting from the dispersion of black zero-valent nickel throughout the cement.

A first aliquot portion of the polymer cement was heated to 176° F. To this first portion there was added water and filter aid to precipitate the nickel and aluminum catalyst components. The particles formed by this treatment were very small and the filter blinded rapidly with little throughput.

A second aliquot portion of the polymer cement was heated to 176° F. To this second portion there was added an aqueous ammonium phosphate solution having a pH of 6.1 and containing about 20 weight percent phosphate ion. Filtration at high flow rates and throughputs was achieved with this treatment. However, appreciable quantities of colloidal-size black zero-valent nickel passed through the filtering medium, thereby resulting in a hydrogenated polymer having an unacceptably high ash content, and which was not suitable for use as a viscosity index modifier.

A third aliquot portion of the polymer cement was heated to 176° F. To this third portion there was added an aqueous ammonium phosphate solution having a pH of 6.1 and containing about 20 weight percent phosphate ion. This mixture was contacted with air for 2 hours.

The amount of air was such as to provide a molecular oxygen:nickel molar ratio of 0.5:1. Conversion of the black zero-valent nickel to green nickel salts began to take place almost instantaneously upon contact of air with the mixture, as evidenced by the formation of a greenish precipitate. After about 41 minutes, substantially no additional greenish precipitate was formed. Filtration at high flow rates and throughputs was achieved with this treatment. The ash content of the filtered polymer cement was substantially reduced. The hydrogenated polymer thus treated was satisfactory for use as a viscosity index modifier.

Other aliquot portions of the polymer cement were heated to 176° F. These portions were treated by adding an aqueous ammonium phosphate solution having a pH of 6.1 and containing about 20 weight percent phosphate ion. Each of these several mixtures was then treated with air at varying oxygen:nickel molar ratios. In each instance, at molar ratios of oxygen:nickel below 0.5:1, treatment with air was not effective to oxidize all the black zero-valent nickel to a higher valence state and, while filtration was improved over unmodified cements, the ash content of the filtered polymer was unacceptable. At oxygen:nickel molar ratios at least equal to 0.5:1, complete oxidation occurred in less than 45 minutes of air contact. Filtration of these latterly-treated polymer cements was readily accomplished and the cements exhibited substantially reduced ash contents within acceptable levels.

In a similar manner, an aliquot portion of the polymer cement was heated to 176° F. and sequentially treated with aqueous ammonium solution as earlier described and hydrogen peroxide in an amount of 0.26 part by weight per 100 parts by weight of polymer (oxygen:nickel molar ratio of 0.5:1). Conversion of black zero-valent nickel to green nickel salts was considered complete after about 20 minutes. Based upon the results of filtration and ash content which were obtained from successful oxidation treatments with air, the treatment with hydrogen peroxide was considered a success.

Similarly, aliquot portions of polymer cement were heated to 176° F. and sequentially treated with water and air, with the air being supplied in a quantity to provide an oxygen:nickel molar ratio of 0.5:1. At a water:nickel molar ratio of 6.6:1, very little oxidation of zero-valent nickel was observed. At a water:nickel molar ratio of 13.6:1, complete oxidation of zero-valent nickel required some 23 hours of oxygen contact. At water:nickel molar ratios above 18:1, however, complete oxidation of zero-valent nickel was obtained in 20–90 minutes.

The foregoing work demonstrates the effectiveness of the procedure of the invention in improving filtration rates and reducing ash content of hydrogenated polymeric materials. The data further demonstrate the necessity of pretreating the hydrogenation catalyst residue-containing polymer with water before contacting the polymer with the oxidant and the necessary water:catalyst and oxygen:catalyst relationships.

Reasonable variations and modifications are possible within the scope of this disclosure without departing from the spirit and scope thereof.

What is claimed is:

1. A process for separating a hydrogenation catalyst formed by mixing (a) a compound of the formula $Al(R)_3$, wherein R is hydrogen or an alkyl, cycloalkyl or aryl radical or combinations thereof having 1 to 20 carbon atoms; and (b) a compound of the formula

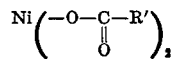

wherein R' is hydrogen or an alkyl, cycloalkyl, or aryl radical or combinations thereof having 1 to 20 carbon atoms from a solution containing said hydrogenation catalyst and from 1 to 50 weight percent of a hydrogenated polymer in a hydrocarbon solvent which comprises contacting said solution with an aqueous solution containing phosphate and ammonium ions, the pH of the solution being greater than 5 and the phosphate ion content in the range of 5 to 50 weight percent, and an oxidant selected from the group consisting of molecular oxygen or an oxygen-containing compound having an electrochemical reaction potential at 25° C. of at least 0.250 volt, the amount of said oxidant shall provide an oxygen:nickel equivalent ratio of at least 1:1, said catalyst shall be deactivated prior to the addition of said oxidant, and thereafter separating the resulting precipitated catalyst residues from said soluion.

2. A process according to claim 1 wherein said polymer is selected from the group consisting of homopolymers and copolymers of conjugated dienes having from 4 to 12 carbon atoms and copolymers of conjugated dienes having from 4 to 12 carbon atoms and monovinylidene-substituted aromatic compounds having from 8 to 18 carbon atoms.

3. A process according to claim 2 wherein said polymer is a copolymer of butadiene and styrene.

4. A process according to claim 2 wherein said oxidant is molecular oxygen.

5. A process according to claim 3 wherein said oxidant is molecular oxygen.

6. A process according to claim 1 wherein said nickel and aluminum phosphates are separated by filtration.

References Cited
UNITED STATES PATENTS
3,531,448    9/1970    Johnson _____ 260—85.1

JOSEPH L. SCHOFER, Primary Examiner
W. F. HAMROCK, Assistant Examiner

U.S. Cl. X.R.
260—82.1, 88.2 S, 94.7 H, 94.9 F, 96 H